Oct. 6, 1953     L. O. COPE ET AL     2,654,177
FISHING LINE ATTACHMENT
Filed July 17, 1950
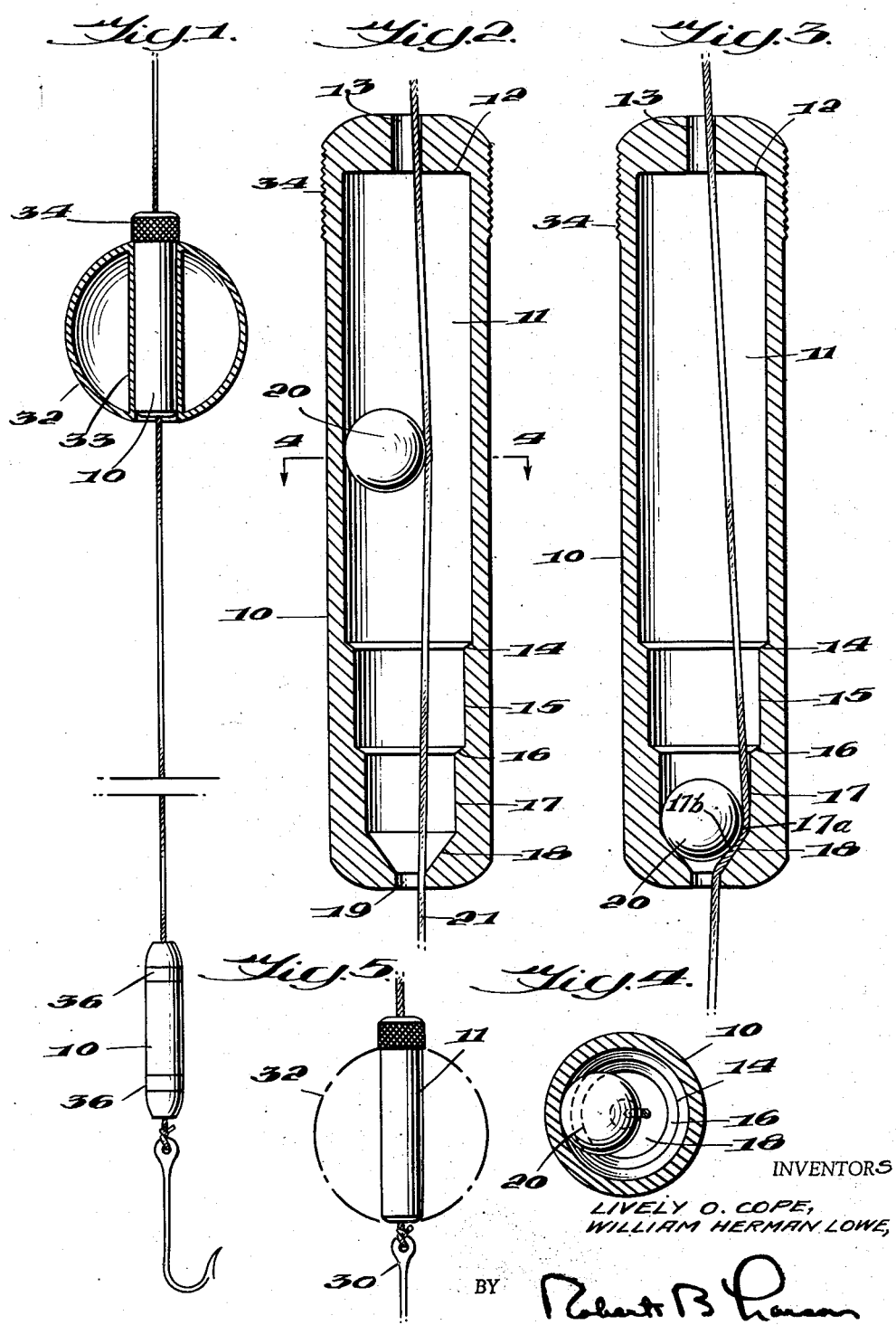
INVENTORS
LIVELY O. COPE,
WILLIAM HERMAN LOWE,
BY Robert B. Larson
ATTORNEY Patented Oct. 6, 1953

2,654,177

UNITED STATES PATENT OFFICE 2,654,177

FISHING LINE ATTACHMENT

Lively O. Cope, Morganton, and William Herman Lowe, North Wilkesboro, N. C.

Application July 17, 1950, Serial No. 174,222

4 Claims. (Cl. 43—44.88)

This invention relates to a fishing line attachment, and more particularly to a device which is adjustable along a fishing line to selected positions in which the attachment can be locked in a simple and rapid, yet efficient manner.

In the attachment to fishing lines of floats, sinkers, and the like, it is very desirable to be able to move such attachments along the fishing line to selected positions with a minimum of inconvenience, and it is also highly desirable that when the hook is being reeled in after a fish has been caught, the attachments on the line between the reel and the hook should be movable along the line so as to permit reeling of the fish as close as possible to the end of the fishing rod. In the case of most floats, sinkers, and the like, once these elements are attached to a fishing line, they limit the amount of line which can be reeled in, and limit the nearness to end of the rod to which the fish can be brought by manipulation of the reel, since these attachments strike the end of the rod and prevent further movement of the line. Where a fishing float is set at a considerable depth, say five or ten feet, it is obvious that if the float is fixed immovably in place on the line, the fish which is caught can only be brought to within ten feet of the end of the rod, and this often renders it inconvenient and even difficult to bring the fish into the boat or into the shore where the fisherman is located.

In order to overcome the inconvenience just described and to provide for ready adjustment of the position of a fishing line attachment, such as a float or sinker, the present invention is directed to an attachment which provides locking of a fishing line against movement in one direction, but permits the line to unlock when being moved in the other direction with regard to the attachment, so that a float or other attachment which is located at a desired position on a fishing line does not prevent reeling of the fish into close proximity with the end of a fishing rod.

Accordingly, it is an important object of the invention to provide a fishing line attachment which is quickly and easily adjustable to a desired position on a fishing line, and which prevents movement of the line in one direction with regard to the attachment, but which nevertheless permits movement of the line in the opposite direction under certain conditions.

Another object of the invention is the provision, in a fishing line attachment, of a body element having an interior cavity of circular cross section terminating in end openings of reduced diameter adapted for free passage of a fishing line, at least a portion of said cavity having parallel side walls, and a ball freely movable in said cavity portion, said ball having a diameter only slightly smaller than said cavity portion so as to compress a fishing line between its surface and the wall of said cavity portion to lock the line against movement except when accompanied by rolling of the ball, and an inwardly extending end surface at the termination of said cavity portion to limit rolling movement of the ball.

A further object of the invention is to provide a novel fishing line float arrangement utilizing an attachment having the advantages just described.

Another object of the invention is the provision of a fishing line weight which includes the attachment described above.

A further object of the invention is to provide a fishing line attachment having the advantages described above, and which is easily attached to the line, is easily moved to desired positions on the line, provides efficient locking of the attachment to the line, and which is cheap and inexpensive to manufacture.

These and other objects of the invention will be apparent from the following specification when taken in conjunction with the accompanying drawing in which Fig. 1 is a side elevational view, partly in section, showing the novel attachment on a fishing line in conjunction with a float, and showing at the lower part of the figure a side elevational view of the attachment used as a weight;

Fig. 2 is a longitudinal sectional view of an attachment made in accordance with a preferred form of the invention, the ball being in unlocked position;

Fig. 3 is a view similar to Fig. 2, but showing the ball in locking position;

Fig. 4 is a cross sectional view taken on line 4—4 of Fig. 2; and

Fig. 5 is a view similar to the upper portion of Fig. 1, but showing the attachment and float carried thereby after they have been moved down to the end of the hook by reeling in the line.

Referring now to the preferred embodiment of the invention as shown in the drawings, the attachment, as best shown in Figs. 2-4, comprises a hollow cylindrical body element 10 having a cylindrical cavity 11 comprising a main portion of the interior of the element 10. The cavity portion 11 terminates at the upper end of the body element in a transverse surface 12 through which passes an opening 13 adapted to receive a fishing line for free movement therethrough. At the other end of cavity portion 11, there is a frusto-conical surface portion 14 passing to a cavity portion 15 of slightly reduced diameter. This portion 15 terminates in another frusto-conical wall portion 16 which passes to a still smaller cavity portion 17. The portion 17 terminates in an inwardly extending wall surface 18 which leads to an opening 19 through the lower end of the body element, and through which a fishing line is adapted to pass freely.

It will be noted that each of the cavity portions 11, 15 and 17 are truly cylindrical, that is, that opposite side walls are parallel.

Inside the body element 10 is a locking ball 20 which is considerably smaller in diameter than the cavity portion 11 and which is slightly smaller in diameter than cavity portion 17. The difference in diameter between ball 20 and cavity portion 17 is sufficient to accommodate the smallest size fishing line intended to be used with the attachment. Such a line is shown at 21.

In operation, a fishing line may be inserted into the body element or capsule 10 through one of the end openings 13 or 19, and by tilting the capsule to roll the ball into the enlarged main cavity portion 11, the line will pass freely through the capsule. When it is desired to lock the attachment to the fishing line at a selected place on the line, the line is pulled in the direction of the cavity portions 15 and 17, that is, downwardly in Figs. 2 and 3. When this is done, the ball 20 is rolled or falls into the appropriate cavity portion 15 or 17. If a relatively small fishing line 21 is used, the ball will pass into the portion 17 and will lock the line by compressing the line between the ball and the surface 17. If a larger line is used, that is, a line larger than could be present in cavity 17 with the ball, then the line will be locked by being pressed against cavity wall 15, the ball then being in the cavity 15 rather than in the cavity 17, where it is shown in Fig. 3.

The locking of the line against a cavity wall 15 or 17 has been referred to as including squeezing of the line between the ball and the cavity wall, for example, at point 17a. Actually, this squeezing is accompanied by the ability of the ball to roll toward the lower end of the capsule as the line is pulled in that direction. The locking is accomplished by the presence of the inwardly directed surface 18 which limits the rolling of the ball and forms a wall against which the line may be compressed by the ball at point 17b, but the locking of the line is between the ball and the surface 15 or 17, and not primarily between the ball and either of the sloping surfaces 14, 16, or 18, these surfaces merely serving to prevent further rolling motion of the ball. The ball 20 compresses the line against the parallel walls 15 or 17, and by stopping the ball against frustation leading to a smaller interior cavity, this also stops the line. By means of this arrangement, the line 21 is locked.

When it is desired to readjust the position of the attachment on the line, it is merely necessary to pull upwardly on the line to roll the ball 20 out of the cavity portion or socket in which it is locked. As soon as the ball reaches the next larger cavity portion, the line is free to continue its motion upwardly. If it is desired to move the line in the downward direction, as the capsule is shown in Figs. 2 and 3, there are two alternatives from which the user may chose. First, he may invert the capsule so that the ball 20 remains in what has become the lower end of the capsule by reason of the force of gravity. This would mean that the ball would be in the portion of the capsule which terminates in transverse wall 12. The second alternative is to maintain a slight tension on the upper portion of the string and to pull downwardly on the string. The tension on the upper portion of the string holds the ball in the large cavity portion 11, as is shown in Fig. 2, and prevents the ball from moving downwardly in locking position. In using the second alternative, it is of course unnecessary to invert the capsule.

As has been previously explained herein, one of the desirable advantages of the attachment is to permit a float or such other device as is used in connection with the attachment to be slid along the line as the line is reeled in, after the attachment contacts the end of the fishing rod. This is accomplished by reason of the fact that once the upper end of the capsule contacts the end of the fishing rod and can move no further with the line, the continued pull on the line in the upward direction as viewed in Figs. 2 and 3 causes the ball 20 to be rolled upwardly out of the locking socket in which it has been positioned, thereby permitting free movement upwardly of the line 21. This movement can continue until the lower end of the attachment is contacted by some fixed enlargement on the line, such as the upper end of a hook 30 as shown in Fig. 5. The end of the fishing rod might be shown appropriately in this figure in contact with the upper end of the capsule 11.

One convenient manner of using the attachment with the float is by the use of a spherical float 32 as shown in Fig. 1, the float having a central opening 33 therethrough into which the capsule or body element 10 is adapted to fit snugly but removably. The element 10 is conveniently proportioned and dimensioned so that it is slightly longer than the diameter of the sphere 32, and in order to position the element 10 correctly with regard to the sphere so that it can be readily removed therefrom, the upper end of the element 10 is conveniently provided with knurling or other roughening as shown at 34. This knurling not only provides a roughened surface for grasping by the fingers of the user, but it also provides a slightly enlarged diameter which prevents the capsule 10 from moving downwardly into the sphere any further than is shown in Fig. 1. The knurling thus provides a positioning means in addition to a grasping means.

It is convenient to dimension the capsule 10 so that when it is positioned at its lowermost location in the sphere as shown in Fig. 1, the lower end of the capsule is positioned only slightly inwardly from the surface of the sphere. This makes it convenient to push inwardly on the capsule with the finger in order to loosen the capsule from the sphere.

The attachment described herein is obviously not limited to use with a float, but it can be made with the capsule 10 including portions having considerable weight, as shown at 36 in the lower end of Fig. 1, and the attachment can thus be used as a sinker. The advantages described above with regard to the attachment in general are desirable in a sinker, these advantages including ready adjustment of the location of the sinker and the ability to reel in the line till the hook is in close proximity to the end of the fishing rod.

In one embodiment of the invention, the capsule 10 was made of plastic, the ball 20 being of steel or lead. The diameter of the portion 11 was chosen as 17/64 inch, the diameter of the cavity portion 15 was selected as .199 inch, and the diameter of cavity portion 17 was .180 inch. The diameter of the opening 19 was .070 inch, and the diameter of the ball was .172 inch. This capsule was intended for locking an 18 pound test line of .017 inch diameter in the general position as shown in Fig. 3.

It is important to note that, with the sloping shoulders 14, 16, and 18, it is easier to feed a fresh piece of line into the capsule from the upper end. If these sloping surfaces are sloped downwardly considerably more than they are shown in the drawings, it becomes more difficult to hold the ball in a non-locking portion of the cavity by maintaining tension on the upper portion of the line.

It is quite important to the invention that the surfaces defining the cavity portions 11, 15 and 17 be straight surfaces, the opposite side walls of which are parallel. If these surfaces are tapered, the locking is less sure and the ball will not remain in the locked position as readily. It is desirable that the surfaces of the locking socket portions be somewhat elongated so that substantial travel of the cord is required to accomplish unlocking.

It is obvious that the locking cavity portions 15 and 17 could be only one in number, instead of two, that is, the cavity portion 11 could merge into cavity portion 15 which would then terminate in an end wall portion such as 18. The attachment would then operate in exactly the same manner as the construction shown in Figs. 2 and 3, except that the attachment could not accommodate as wide a range of fishing line sizes as could be accommodated in the construction of Figs. 2 and 3. It is also apparent that the number of locking sockets 15 and 17 could be greater, that is, there could be more than two of these cavity portions.

If desired, the lower end of the capsule may protrude beyond the lower end of the float.

In view of the above reference to various possible variations of the construction shown in the drawings, numerous other variations may become apparent, and it is our intention to cover by our patent all such variations which come within the scope of the appended claims.

We claim:

1. In a fishing line attachment, a body element having an interior cavity of circular cross section terminating in end openings of reduced diameter adapted for free passage of a fishing line, at least a portion of said cavity at one end of said element having cylindrical walls of a smaller internal diameter than at the opposite end of said element thus forming a stepped configuration, and a ball freely movable in said cylindrical walled cavity portion, said ball having a diameter only slightly smaller than said cylindrical walled cavity portion so as to compress a fishing line between its surface and the wall of said cavity portion to lock the line against movement except when accompanied by movement of the ball, and an inwardly sloping end wall at the termination of said cavity portion to limit movement of the ball.

2. A fishing line attachment comprising a body element having an elongated interior cavity therein of circular cross section terminating in end openings of reduced diameter adapted for free passage of a fishing line, said cavity comprising a first portion having a cylindrical wall, and a second portion having a cylindrical wall but of smaller diameter than said first portion, a short frusto-conical wall portion at the inner end of said second cavity portion and joining said cavity portions, a short inwardly directed wall portion at the outer end of said second cavity portion, and a ball freely movable in said cavity portions in the absence of fishing line passing through said cavity portions, said ball being only slightly smaller in diameter than said second cavity portion so as to compress a fishing line between its wall and the wall of said second cavity portion to lock the line against movement relative to said attachment except when accompanied by movement of the ball, said movement in the direction of the outer end of said second cavity portion being limited by said short inwardly directed wall portion at the outer end of said second cavity.

3. A fishing line attachment comprising a body element having a cylindrical interior cavity defined by the inner walls of said body element and terminating in end openings of reduced diameter adapted for free passage therethrough of a fishing line, a ball in said cavity of substantially smaller diameter than said cavity, an end portion of said cavity being of smaller diameter than the main portion of said cavity and of slightly larger diameter than said ball so as to form a cylindrical socket for said ball for clamping the line between the wall and the ball so as to permit movement of the line only when accompanied by movement of the ball, a sloping end wall limiting movement of the ball in said socket away from the main portion of the cavity defining a second surface for clamping by said ball, and a sloping wall section connecting the main cavity with said socket so as to facilitate movement of the ball into the socket when the line is moved relative to said body element in the direction of the socket, said ball being movable from said socket to said main cavity portion by movement of the line in the opposite direction, and being retainable in said main cavity portion regardless of the direction of movement of the line if the line is held taut while moving the line in the direction of the socket.

4. A fishing line attachment comprising a body element having an elongated interior cavity therein of circular cross section terminating in end openings of reduced diameter adapted for free passage of a fishing line, said cavity comprising a first portion having a cylindrical wall, and a second portion having a cylindrical wall but of smaller diameter than said first portion, a short frusto-conical wall portion at the inner end of said second cavity portion and joining said cavity portions, a third cavity portion of smaller diameter than said second portion, a short frusto-conical wall portion at the inner end of said third cavity portion and joining said second and third cavity portions, an inwardly directed end wall at the outer end of said third cavity portion, and a ball freely movable in said cavity portions in the absence of a fishing line passing through said cavity portions, said ball being only slightly smaller in diameter than said third cavity portion so as to compress a fishing line between its wall and the wall of said third cavity portion to lock the line against movement relative to said attachment except when accompanied by movement of the ball, said movement in the direction of the outer end of said third cavity portion being limited by said short inwardly directed wall portion at the outer end of said cavity.

LIVELY O. COPE.
WILLIAM HERMAN LOWE.

References Cited in the file of this patent

UNITED STATES PATENTS

| Number | Name | Date |
|---|---|---|
| 717,237 | Marsters | Dec. 30, 1902 |
| 822,694 | Shepherd | June 5, 1906 |
| 1,333,375 | Bauer | Mar. 9, 1920 |
| 1,618,901 | Woolman | Feb. 22, 1927 |
| 2,529,179 | Oberholtzer | Nov. 7, 1950 |

FOREIGN PATENTS

| Number | Country | Date |
|---|---|---|
| 282,996 | Germany | Mar. 29, 1915 |
| 570,752 | France | Jan. 21, 1924 |
| 834,735 | France | Aug. 29, 1938 |